US010240501B2

(12) United States Patent
Sheidler et al.

(10) Patent No.: US 10,240,501 B2
(45) Date of Patent: Mar. 26, 2019

(54) VENTURI EXHAUST GAS COOLER

(71) Applicant: Deere & Company, Moline, IL (US)

(72) Inventors: Alan D. Sheidler, Moline, IL (US); Sai K. Nandigam, Davenport, IA (US); Tyler L. Holp, Bettendorf, IA (US); Xijun Wang, Bettendorf, IA (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 15/096,367

(22) Filed: Apr. 12, 2016

(65) Prior Publication Data

US 2017/0292421 A1   Oct. 12, 2017

(51) Int. Cl.
*F01N 3/05* (2006.01)
*F01N 13/08* (2010.01)
*F01N 3/30* (2006.01)
*F01N 3/34* (2006.01)

(52) U.S. Cl.
CPC ............... *F01N 3/05* (2013.01); *F01N 3/303* (2013.01); *F01N 3/34* (2013.01); *F01N 13/08* (2013.01); *F01N 13/082* (2013.01); *F01N 2470/30* (2013.01)

(58) Field of Classification Search
CPC .................................... F01N 3/05; F01N 3/082
See application file for complete search history.

(56) References Cited

U.S. PATENT DOCUMENTS

| 3,468,397 A * | 9/1969 | Vegeby .................... F04F 5/44 181/252 |
| 3,471,265 A * | 10/1969 | Baust ........................ B01F 3/02 181/249 |
| 3,503,714 A | 3/1970 | Ludwig |
| 3,875,745 A | 4/1975 | Franklin |
| 4,094,645 A * | 6/1978 | Bailey ..................... F01N 1/084 422/180 |
| 4,197,703 A * | 4/1980 | Holmes .................. B60K 13/04 414/460 |
| 7,281,530 B2 * | 10/2007 | Usui ................ F02M 35/10222 123/568.11 |

(Continued)

FOREIGN PATENT DOCUMENTS

| DE | 1099799 B | 2/1961 |
| GB | 2373197 A | 9/2002 |

OTHER PUBLICATIONS

European Search Report in foreign counterpart application No. 17164783.7 dated Jun. 27, 2017 (5 pages).

*Primary Examiner* — Patrick Maines
(74) *Attorney, Agent, or Firm* — Rathe Lindenbaum LLP

(57) ABSTRACT

A two-stage venturi cooler comprises a first tubular conduit having a longitudinal axis, the first elongate tubular conduit having an exhaust gas inlet at one end, a mixed gas outlet at an opposing end, and a cooling gas inlet, wherein structures inside the first stage define a venturi that forms a column of mixed gas, wherein the column of mixed gas comprises a ring of exhaust gas surrounding a core of cooling gas; and a second tubular conduit that is coaxial with the first tubular conduit, wherein the second tubular conduit has a mixed gas inlet at one end and a mixed gas outlet at an opposing end, and wherein the mixed gas inlet is to receive the column of mixed gas and to surround the column of mixed gas with an entrained column of ambient air.

16 Claims, 4 Drawing Sheets

(56) References Cited

U.S. PATENT DOCUMENTS

| | | | |
|---|---|---|---|
| 7,833,301 B2* | 11/2010 | Schindler | B01D 46/4281 |
| | | | 123/198 E |
| 2005/0183704 A1* | 8/2005 | Usui | F02M 35/10222 |
| | | | 123/568.17 |
| 2007/0245725 A1 | 10/2007 | Brown et al. | |
| 2009/0113882 A1* | 5/2009 | Gibson | F01N 3/30 |
| | | | 60/319 |
| 2010/0000205 A1 | 1/2010 | Freese, V | |
| 2010/0107616 A1* | 5/2010 | Janakiraman | F01N 3/05 |
| | | | 60/317 |
| 2011/0011060 A1* | 1/2011 | McCarthy, Jr. | F01N 3/0814 |
| | | | 60/274 |
| 2012/0145268 A1* | 6/2012 | Clarke | F01N 13/082 |
| | | | 138/40 |
| 2012/0318602 A1* | 12/2012 | Bada Ghar Wala | B60K 13/04 |
| | | | 180/309 |
| 2014/0110935 A1* | 4/2014 | Shiizaki | F01N 13/082 |
| | | | 285/332 |
| 2015/0377192 A1* | 12/2015 | Nathak | F02M 35/0216 |
| | | | 123/184.21 |

\* cited by examiner

VENTURI EXHAUST GAS COOLER

FIELD OF THE INVENTION

This invention relates generally to work vehicles. More particularly it relates to exhaust gas coolers for internal combustion engines of agricultural combines.

BACKGROUND OF THE INVENTION

Work vehicles typically have internal combustion engines that emit hot exhaust gases. In recent years, exhaust gas temperatures have increased due to the use of catalytic devices. These devices improve the combustion of internal conventions by using catalysis to oxidize residual combustibles in the flow of exhaust gas leaving the internal combustion engine.

In a first arrangement, shown in U.S. Pat. No. 3,875,745, exhaust gas leaving an internal combustion engine is directed into a chamber that encloses a venturi. The exhaust gas flow is reversed in direction of flow two or three times and is injected into a narrow annular gap. Ambient air is drawn into an open inlet and is carried straight to the venturi by the exhaust gas flow, thereby mixing the hot exhaust gas with much cooler ambient air before the mixture is released into the atmosphere.

A problem with this arrangement is the need to redirect the exhaust gas flow at right angles (several times) and the need to pressurize the exhaust gas surrounding the venturi. This increase in pressure builds up back pressure in the exhaust pipe thereby reducing engine efficiency.

In another arrangement, shown in US2007/0245725 (A1), a dual-stage venturi exhaust cooling device is shown. In this arrangement, exhaust gas flow through the cooler is essentially linear, flowing in a straight line from entrance to exit, thereby reducing the significant back pressure generated by the arrangement of U.S. Pat. No. 3,875,745.

In a first stage of the '725 arrangement, exhaust gases introduced into an elongate tubular structure in a first direction are split to form a ring of exhaust gas. Ambient air is introduced into the exhaust gas ring immediately downstream of the venturi. In a second stage of the '725 arrangement, the mixed exhaust gas and ambient air is channeled into an elongate tube fixed to the end of the venturi. This elongate tube has several apertures disposed along its length into which ambient air is sucked. This arrangement limits the amount of cooling air that can be added in the second stage and induces turbulence and drag from the many discrete punctures in the sidewall.

What is needed is an improved exhaust cooler that avoids the limitations of the prior art by supplying a greater flow of cooling air to mix with the exhaust while providing less drag.

SUMMARY OF THE INVENTION

In accordance with a first aspect of the invention, a two-stage venturi cooler for exhaust gas exiting an internal combustion engine is provided, the cooler comprising: a first elongate tubular conduit having a longitudinal axis, wherein the first elongate tubular conduit has an exhaust gas inlet at one end, a mixed gas outlet at an opposing end, and a cooling gas inlet, wherein structures inside the first stage define a venturi that is configured to form an elongate column of mixed gas, wherein the column of mixed gas comprises a ring of exhaust gas surrounding a core of cooling gas; and a second elongate tubular conduit that is coaxial with the first elongate tubular conduit, wherein the second elongate tubular conduit has a mixed gas inlet at one end and a mixed gas outlet at an opposing end, and wherein the mixed gas inlet is dimensioned and disposed to receive the column of mixed gas and to surround the column of mixed gas with an entrained annular column of ambient air.

The cooler may further comprise a bracket connecting the first elongate tubular conduit to the second elongate tubular conduit.

The mixed gas inlet may be spaced away from the mixed gas outlet to provide an air gap between the mixed gas inlet and the mixed gas outlet.

The air gap may extend completely around the longitudinal axis.

The cooler may further comprise a cooling gas conduit having a cooling gas outlet disposed inside the first elongate tubular conduit, wherein the cooling gas outlet receives cooling gas from the cooling gas inlet and releases the cooling gas through the cooling gas outlet.

The second elongate tubular conduit may be in the form of a sheet metal tube with a generally circular cross section.

The mixed gas inlet may have a diameter that is greater than a diameter of the mixed gas outlet.

The mixed gas inlet may have a diameter that is at least 25% greater than the diameter the mixed gas outlet.

The mixed gas inlet may have a diameter that is at least 50% greater than the diameter of the mixed gas outlet.

The mixed gas inlet may have a diameter that is at least 100% greater than the diameter of the mixed gas outlet.

The cooler may further comprise an exhaust aftertreatment device (ATD) coupled to the exhaust gas inlet, and an engine combustion air cleaner coupled to the cooling gas inlet.

DETAILED DESCRIPTION OF THE DRAWINGS

The term "mixed gas" refers to a combination of exhaust gas and atmospheric gas (such as atmospheric air) which is combined with the exhaust gas in order to mix with the exhaust gas and cool it.

Figure 1:
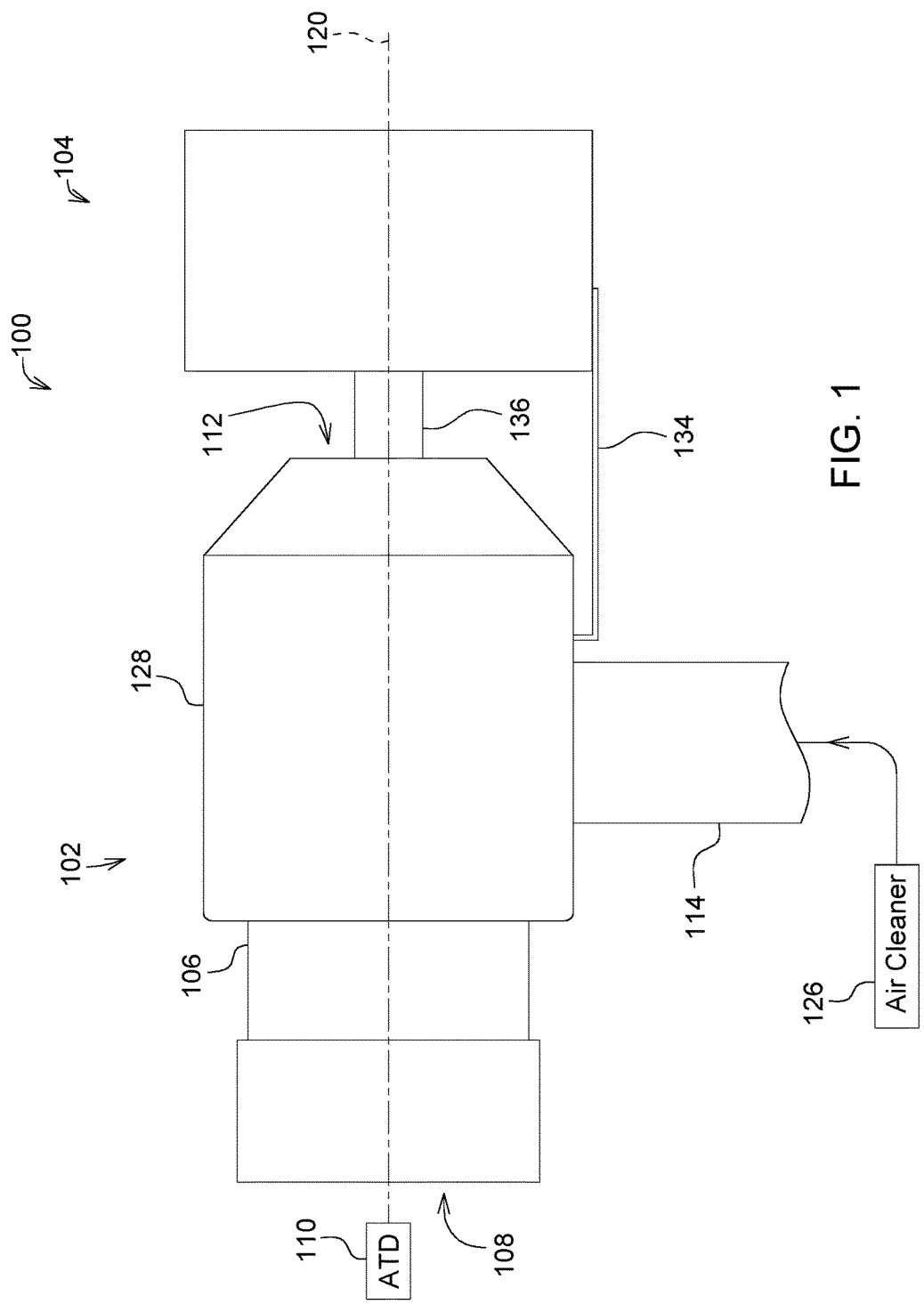
FIG. 1 is a side view of an exhaust cooler in accordance with the present invention.
Figure 3:
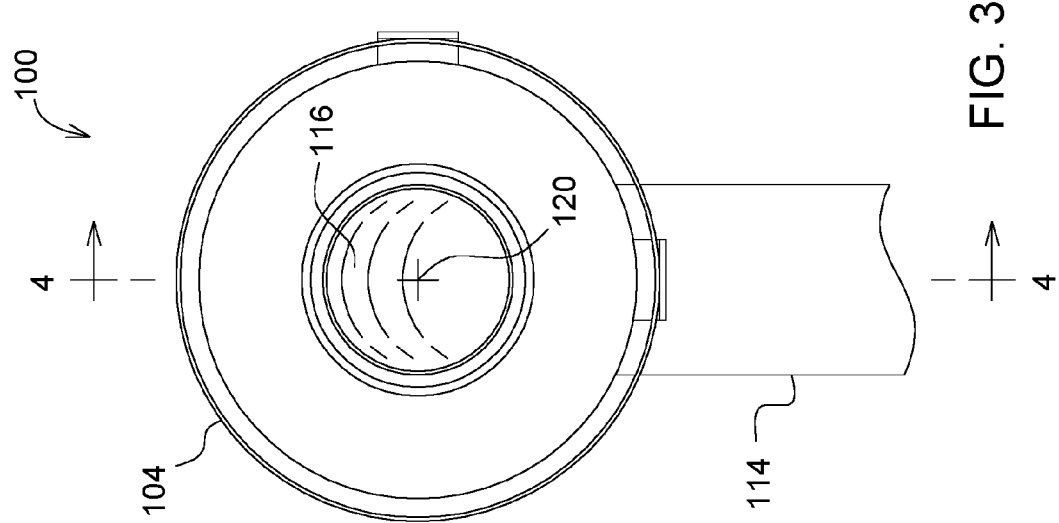
FIG. 3 is a right end view of the exhaust cooler of FIG. 1.
Figure 2:
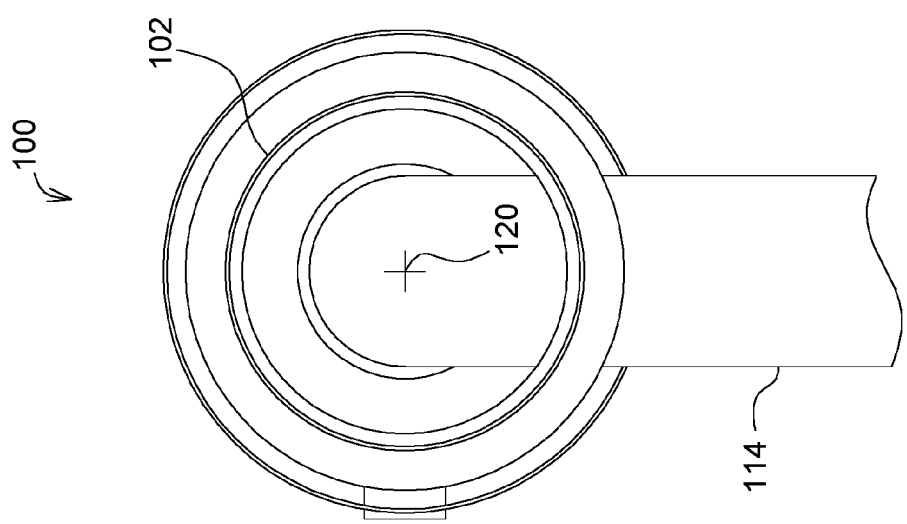
FIG. 2 is a left end view of the exhaust cooler of FIG. 1.
Figure 4:
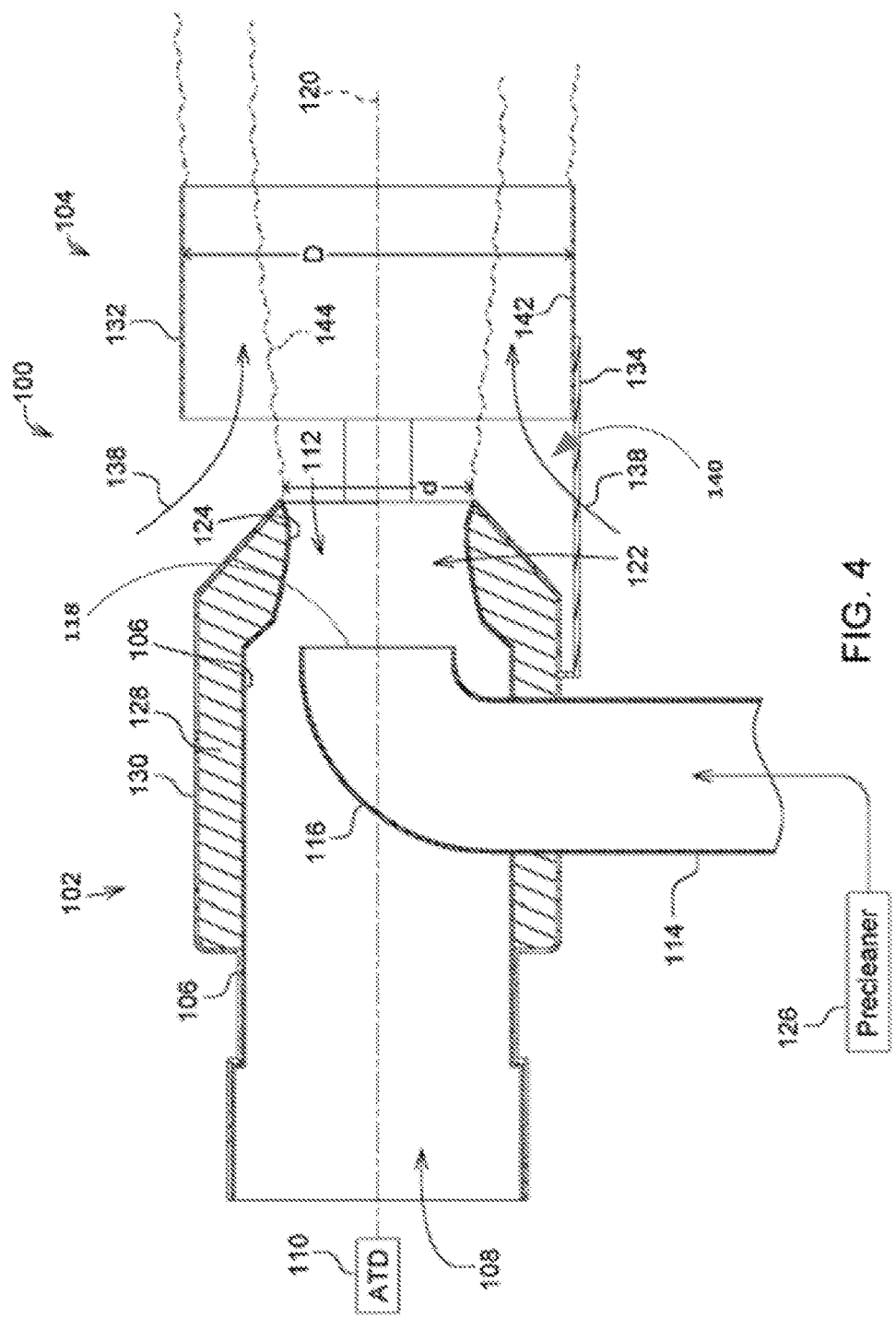
FIG. 4 is bottom view of the exhaust cooler of FIG. 1.
Figure 5:
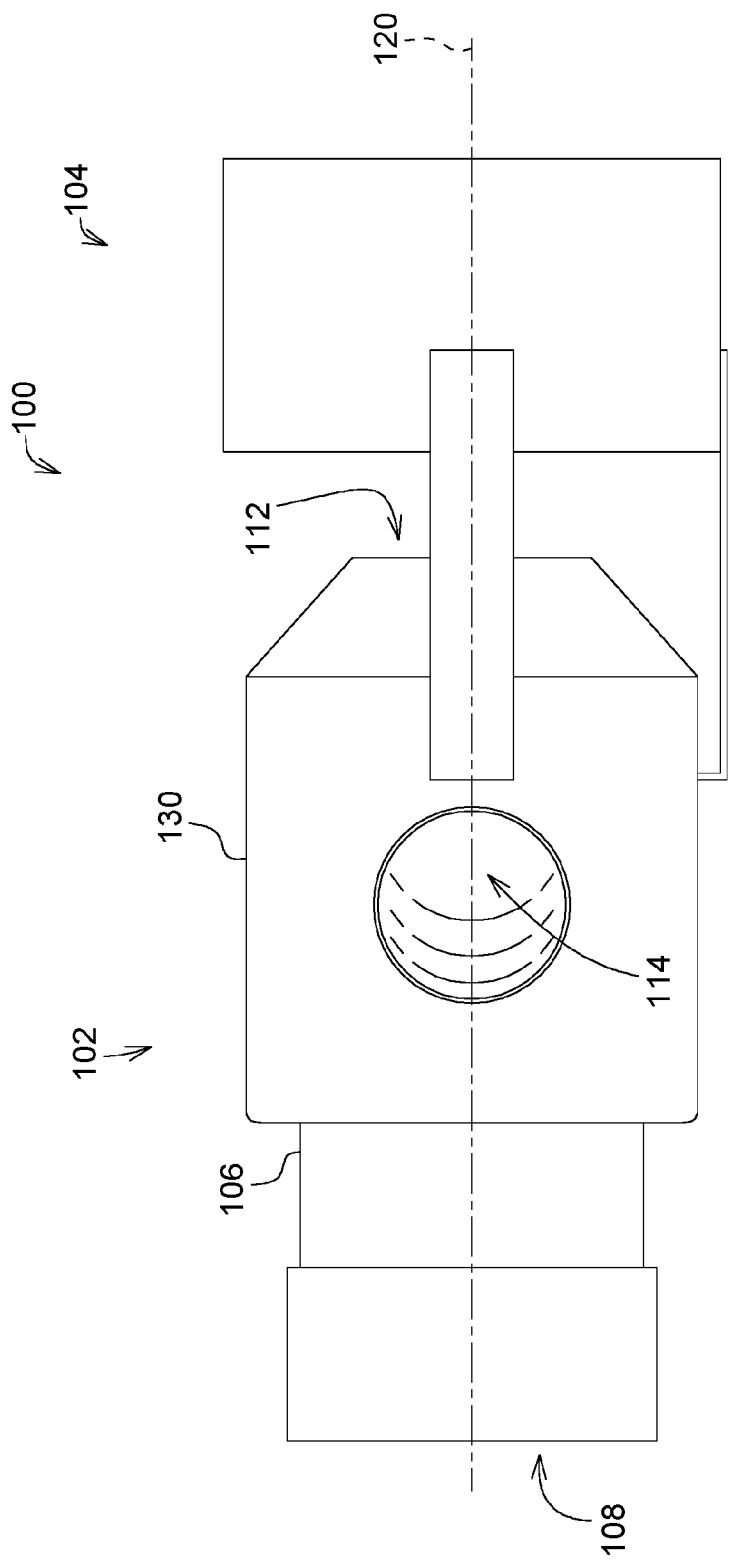
FIG. 5 is a cross-sectional side view of the exhaust cooler of FIG. 1.

Referring to the figures and particularly to FIGS. 1 and 4, an exhaust gas cooler 100 is comprised of two stages: a first stage 102 and a second stage 104. Both stages of the exhaust gas cooler 100 are generally symmetric about a longitudinal axis 120 of the exhaust gas cooler 100.

The first stage 102 comprises a first conduit 106 that is tubular and elongate. The first conduit 106 is generally circular in cross-section. It has an exhaust gas inlet 108 that receives exhaust gas from an exhaust aftertreatment device (ATD) 110 which is coupled to the exhaust gas inlet 108. Exhaust gas passes from the ATD into the exhaust gas inlet 108, and is conveyed to a mixed gas outlet 112 where it exits the first stage 102.

The exhaust gas passing through the first conduit 106 travels in a generally straight line from the exhaust gas inlet 108 to (and through) the mixed gas outlet 112. This direction of travel is generally parallel to the longitudinal axis 120. The first conduit 106 has an inside surface that is coaxial with the longitudinal axis 120. By conducting the exhaust gas flow in a straight line through the cooler 100, the flow velocity is maintained and backpressure is reduced.

The first conduit one has a generally constant inside diameter along its length starting at the exhaust gas inlet 108. Adjacent to the mixed gas outlet 112, however, the interior diameter tapers inwards to form a venturi 122 (a region of smaller diameter) and then tapers outwards again such that the throat 124 of the venturi is located slightly inward and away from the mixed gas outlet.

A cooling gas inlet 114 is coupled to the first conduit 106 to provide a supply of cooling air to the first stage 102. A structure 116 that is hollow and tubular and located inside the first conduit 106 conveys the cooling gas through the interior of the first conduit 106. The structure 116 defines a cooling gas outlet 118 through which cooling gas is released into the interior of the first conduit 106.

The cooling gas outlet 118 is generally circular, and is positioned perpendicular to a longitudinal axis 120 of the exhaust gas cooler 100.

When exhaust gas flows through the first stage 102, a slightly below-atmospheric pressure is formed at the throat of the venturi. This low-pressure region is communicated to the cooling gas outlet 118, thereby providing a slight vacuum at the cooling gas outlet 118. As a result of this slight vacuum produced by the venturi 122 and by the flow of exhaust gas around the outer surface of the structure 116, a cooling gas (i.e. cleaner in this example) is sucked into the engine air pre-cleaner 126, into the cooling gas inlet 114, travels through the structure 116, passes through the cooling gas outlet 118 and is received in the venturi 122.

The cooling gas passing through the cooling gas outlet 118 forms a central core of gas flow that is surrounded by a hollow and generally circular (in cross-section) concentric layer of hot exhaust gas. The circular shape of the exhaust gas layer is formed by the structure 116 in the interior walls of the first conduit 106.

Mixing of this core of cool gas and ring of hot exhaust gas occurs at the boundary between these two layers due to the difference in velocity between the somewhat faster-moving exhaust gas and the slower-moving cooling gas. By the time the flow of exhaust gas plus cooling gas (i.e. the mixed gas) reach the mixed gas outlet 112 at the outlet of the first stage 102, some mixing has already occurred.

The first conduit 106 is surrounded by a jacket 128 of insulating material that is symmetric about the axis 120 and is enclosed and protected by a shroud 130.

The second stage 104 is in the form of a hollow cylinder 132, formed of sheet metal, as a right circular cylinder. It has a constant diameter over its length. It is fixed to the first stage 102 with two brackets 134, 136 that couple the first stage and second stage together. The brackets 134, 136 are thin flat straps.

The brackets hold the first stage 102 and the second stage 104 in a spaced-apart relationship sufficient to provide an annular air inlet 138 that extends substantially completely around the cooler 100 about the axis 100. This annular air inlet defines an annular gap 140 between the first stage 102 and the second stage 104.

The inlet diameter "D" of the cylindrical passageway extending through the hollow cylinder 132 is larger than the outlet diameter "d" of the mixed gas outlet 112. As a result, the column of mixed gas 144 leaving the first stage 102 and passing into the second stage 104 travels down a central region of the second stage 104 leaving an annular gap between the inner surface 142 and the column of mixed gas entering the inlet of the second stage 104.

This movement of the column of mixed gas 144 between the first stage and the second stage and into the second stage generates an annular region of reduced pressure in the annular air inlet 138 that pulls an annular flow of air into the second stage 104 that surrounds the column of mixed gas 144 leaving the first stage 102.

Thus, the column of gas flowing into and through the second stage has a central core of cool gas introduced by the cooling gas inlet 118, surrounded by an annular layer of hot exhaust, which in turn is surrounded by an annular layer of cool gas pulled into the annular air inlet 138. These three layers of gas (cool core, hot middle layer, outer layer cool) mix together as they pass through the second stage, and exit the second stage.

By separating the first and second stages and by providing an annular gap between the first stage 102 and the second stage 104, cooling gas is permitted to surround the hot exhaust gas more easily than the '725 arrangement and in greater volumes. Further, by providing a second stage with a greater internal diameter than that of the first stage, the back pressure is reduced in the second stage as compared to the '725 arrangement. In the arrangement illustrated herein, the diameter of the mixed gas inlet of the second stage is approximately 100% greater than the diameter of the mixed gas outlet of the first stage. Depending upon the temperature of the exhaust gas, the diameter of the mixed gas inlet can be reduced to only 50% greater or even 25% greater than the diameter of the mixed gas outlet of the first stage.

The claims define the invention, which is not limited to the specific embodiment or embodiments described herein. Obvious variations of the specific embodiments shown herein will be apparent to one skilled in the art.

We claim:

1. A two-stage venturi cooler for exhaust gas exiting an internal combustion engine, the cooler comprising:
    a first elongate tubular conduit having a longitudinal axis, wherein the first elongate tubular conduit has an exhaust gas inlet at one end, a mixed gas outlet at an opposing end, and a cooling gas inlet having a cooling gas outlet within the first elongate tubular conduit between the exhaust gas inlet and the mixed gas outlet, wherein structures inside the first elongate tubular conduit define a tapering interior diameter that tapers towards the mixed gas outlet to form a venturi that is configured to form an elongate column of mixed gas, the tapering interior diameter extending between the cooling gas outlet and the mixed gas outlet, wherein the column of mixed gas comprises a ring of exhaust gas surrounding a core of cooling gas; and
    a second elongate tubular conduit that is coaxial with the first elongate tubular conduit, wherein the second elongate tubular conduit has a mixed gas inlet at one end and a mixed gas outlet at an opposing end, and wherein the mixed gas inlet is dimensioned and disposed to receive the column of mixed gas and to surround the column of mixed gas with an entrained annular column of ambient air.

2. The cooler of claim 1, further comprising a bracket connecting the first elongate tubular conduit to the second elongate tubular conduit.

3. The cooler of claim 1, wherein the mixed gas inlet is spaced away from the mixed gas outlet to provide an air gap between the mixed gas inlet and the mixed gas outlet.

4. The cooler of claim 3, wherein the air gap extends completely around the longitudinal axis.

5. The cooler of claim 1, further comprising a cooling gas conduit having the cooling gas outlet, wherein the cooling gas outlet receives cooling gas from the cooling gas inlet and releases the cooling gas through the cooling gas outlet.

6. The cooler of claim 1, wherein the second elongate tubular conduit is in the form of a sheet metal tube with a generally circular cross section.

7. The cooler of claim 1, wherein the mixed gas inlet has a diameter that is greater than a diameter of the mixed gas outlet.

8. The cooler of claim 7, wherein the mixed gas inlet has a diameter that is at least 25% greater than the diameter of the mixed gas outlet.

9. The cooler of claim 8, wherein the mixed gas inlet has a diameter that is at least 50% greater than the diameter of the mixed gas outlet.

10. The cooler of claim 9, wherein the mixed gas inlet has a diameter that is at least 100% greater than the diameter of the mixed gas outlet.

11. The cooler of claim 1, further comprising an exhaust aftertreatment device (ATD) coupled to the exhaust gas inlet to transmit exhaust gas leaving the ATD to the exhaust gas inlet, and an engine combustion air cleaner coupled to the cooling gas inlet to provide a cleaned atmospheric air to the cooling gas inlet.

12. The cooler of claim 1, wherein the structures inside the first elongate tubular member form a widening inner diameter that widens towards the mixed gas outlet, the widening inner diameter being located between the tapering inner diameter and the mixed gas outlet.

13. The cooler of claim 1, wherein the first elongate tubular conduit and the second elongate tubular conduit are axially spaced from one another along the longitudinal axis such that the mixed gas outlet is axially spaced from the mixed gas inlet of the second elongate tubular conduit.

14. The cooler of claim 13, wherein the first elongate tubular conduit has a tapering exterior tapering to the mixed gas outlet.

15. A two-stage venturi cooler for exhaust gas exiting an internal combustion engine, the cooler comprising:

a first elongate tubular conduit having a longitudinal axis, wherein the first elongate tubular conduit has an exhaust gas inlet at one end, a mixed gas outlet at an opposing end, and a cooling gas inlet, wherein structures inside the first stage define a venturi that is configured to form an elongate column of mixed gas, wherein the column of mixed gas comprises a ring of exhaust gas surrounding a core of cooling gas; and a second elongate tubular conduit that is coaxial with the first elongate tubular conduit, wherein the second elongate tubular conduit has a mixed gas inlet at one end and a mixed gas outlet at an opposing end, wherein the mixed gas inlet of the second elongate tubular conduit is axially spaced from the mixed gas outlet of the first elongate tubular conduit and wherein the mixed gas inlet is dimensioned and disposed to receive the column of mixed gas and to surround the column of mixed gas with an entrained annular column of ambient air.

16. The cooler of claim 15, wherein the first elongate tubular conduit has a tapering exterior tapering to the mixed gas outlet.

* * * * *